US011134527B2

(12) United States Patent
Chang et al.

(10) Patent No.: US 11,134,527 B2
(45) Date of Patent: Sep. 28, 2021

(54) RADIO CONFIGURATION METHOD AND CORRESPONDING USER EQUIPMENT

(71) Applicants: SHARP KABUSHIKI KAISHA, Sakai (JP); FG INNOVATION COMPANY LIMITED, Tuen Mun (HK)

(72) Inventors: Ningjuan Chang, Shanghai (CN); Renmao Liu, Shanghai (CN); Fangying Xiao, Shanghai (CN)

(73) Assignees: FG Innovation Company Limited, Hong Kong (HK); Sharp Kabushiki Kaisha, Osaka (JP)

( * ) Notice: Subject to any disclaimer, the term of this patent is extended or adjusted under 35 U.S.C. 154(b) by 94 days.

(21) Appl. No.: 16/620,735

(22) PCT Filed: Jun. 11, 2018

(86) PCT No.: PCT/CN2018/090622
§ 371 (c)(1),
(2) Date: Dec. 9, 2019

(87) PCT Pub. No.: WO2018/228328
PCT Pub. Date: Dec. 20, 2018

(65) Prior Publication Data
US 2021/0168882 A1 Jun. 3, 2021

(30) Foreign Application Priority Data

Jun. 15, 2017 (CN) .......................... 201710455302.1

(51) Int. Cl.
*H04W 76/11* (2018.01)
*H04W 76/15* (2018.01)
(Continued)

(52) U.S. Cl.
CPC ........ *H04W 76/11* (2018.02); *H04W 28/0268* (2013.01); *H04W 76/15* (2018.02);
(Continued)

(58) Field of Classification Search
CPC ..... H04W 76/11; H04W 76/15; H04W 76/30; H04W 76/27; H04W 28/0268; H04W 80/02
See application file for complete search history.

(56) References Cited

U.S. PATENT DOCUMENTS

2017/0048922 A1 2/2017 Lee et al.
2020/0008118 A1* 1/2020 Han ...................... H04W 76/11
(Continued)

OTHER PUBLICATIONS

NTT Docomo, "New SID Proposal: Study on New Radio Access Technology", RP-160671, 3GPP TSG RAN Meeting #71 Göteborg, Sweden, Mar. 7-10, 2016.
(Continued)

*Primary Examiner* — Ricky Q Ngo
*Assistant Examiner* — Stephen N Steiner
(74) *Attorney, Agent, or Firm* — Imperium Patent Works (57) ABSTRACT

The present disclosure provides a method executed at UE. The method comprises: determining whether a DRB-related identifier that is part of current UE configurations is included in a received RRC configuration, wherein the DRB-related identifier comprises one of the following: a PDU session identifier, a QoS flow identifier, and an SDAP identifier, and if the DRB-related identifier is included in the RRC configuration, then releasing one or a plurality of the following items of a DRB associated with the DRB-related identifier: a PDCP entity, an RLC entity, a DTCH, a DRB identifier, and an SDAP entity. The present disclosure further provides corresponding UE.

4 Claims, 4 Drawing Sheets

(51) Int. Cl.
*H04W 76/30* (2018.01)
*H04W 76/27* (2018.01)
*H04W 28/02* (2009.01)
*H04W 80/02* (2009.01)

(52) U.S. Cl.
CPC ........... *H04W 76/27* (2018.02); *H04W 76/30* (2018.02); *H04W 80/02* (2013.01)

(56) References Cited

U.S. PATENT DOCUMENTS

2020/0178113 A1* 6/2020 Jin .................... H04W 28/0268
2020/0213894 A1* 7/2020 Agiwal ............. H04W 28/0263

OTHER PUBLICATIONS

Alcatel-Lucent et al., "Full configuration solution for eNB release handling", R2-101883, 3GPP TSG-RAN WG2 Meeting #69 San Francisco, USA, Feb. 22-26, 2010.

* cited by examiner

RADIO CONFIGURATION METHOD AND CORRESPONDING USER EQUIPMENT

TECHNICAL FIELD

The present disclosure relates to the wireless communications technologies field. More specifically, the present disclosure relates to a radio configuration method and corresponding user equipment.

BACKGROUND

A new research project on 5G technical standards (see non-patent literature: RP-160671: New SID Proposal: Study on New Radio Access Technology) was proposed by NTT DOCOMO at the 3rd Generation Partnership Project (3GPP) RAN #71 plenary meeting held in March 2016, and was approved. The goal of the research project is to develop a New Radio (NR) access technology to meet all of the application scenarios, requirements, and deployment environments of 5G. NR mainly has three application scenarios: Enhanced Mobile Broadband Communications (eMBB), massive Machine Type Communications (mMTC), and Ultra Reliable and Low Latency Communications (URLLC).

Different from a Long Term Evolution (LTE) system where the concept of Evolved Packet System (EPS) bearer is employed for assurance of end-to-end Quality of Service (QoS) of data transmission, a new QoS structure, namely QoS flow-based QoS assurance, is introduced to NR. In the NR adhoc meeting held in January 2017, RAN2 decided to introduce a new radio protocol layer, referred to as a Service Data Adaptation Protocol (SDAP) layer, to support the newly introduced QoS mechanism. The radio protocol layer will at least accomplish mapping between a Data Radio Bearer (DRB) and a QoS flow and perform QoS flow ID identification on data packets. Other functions are still under discussion. This layer is located above the Packet Data Convergence Protocol (PDCP) layer.

The present disclosure focuses on and solves the technical problem of how to execute radio configuration (also referred to as radio reconfiguration in the present disclosure, both which can be used interchangeably and similarly hereinafter) on the basis of a full configuration option in an NR QoS architecture.

SUMMARY

The objective of the present disclosure is to solve the above technical problem. Specifically, the present disclosure is intended to solve the technical problem of how to execute radio configuration on the basis of a full configuration option.

In order to achieve the above objective, a first aspect of the present disclosure provides a method executed at User Equipment (UE), comprising:

determining whether a Data Radio Bearer (DRB)-related identifier that is part of current UE configurations is included in a received Radio Resource Control (RRC) configuration, wherein the DRB-related identifier comprises one of the following: a Protocol Data Unit (PDU) session identifier, a Quantity of Service (QoS) flow identifier, and a Service Data Adaptation Protocol (SDAP) identifier; and if the DRB-related identifier is included in the RRC configuration, then releasing one or a plurality of the following items of a DRB associated with the DRB-related identifier: a Packet Data Convergence Protocol (PDCP) entity, a Radio Link Control (RLC) entity, a Dedicated Traffic Channel (DTCH), a DRB identifier, and an SDAP entity.

In an exemplary embodiment, if the DRB-related identifier is the PDU session identifier or the QoS flow identifier, then the releasing the SDAP entity of the DRB associated with the DRB-related identifier further comprises: releasing the SDAP identifier corresponding to the SDAP entity.

In an exemplary embodiment, the method further comprises: if the DRB-related identifier is not included in the RRC configuration, then executing releasing of the DRB associated with the DRB-related identifier; and indicating, to an upper layer of an RRC layer, the releasing of the DRB associated with the DRB-related identifier and the DRB-related identifier, wherein the releasing of the DRB associated with the DRB-related identifier comprises: releasing one or a plurality of the following items of the DRB associated with the DRB-related identifier: the PDCP entity, the RLC entity, and the DTCH.

In an exemplary embodiment, the method further comprises: executing a DRB addition and/or modification according to the received RRC configuration, wherein the executing the DRB addition and/or modification comprises: for a DRB identifier included in the RRC configuration but is not part of the current UE configurations, if an RRC connection reconfiguration message comprises a full configuration information element, then associating the added and/or modified DRB with a corresponding DRB-related identifier.

In an exemplary embodiment, the RRC configuration comprises one or a plurality of the following items: a DRB addition modification configuration, an SDAP configuration, and a QoS flow configuration.

According to a second aspect of the present disclosure, User Equipment (UE) is provided, comprising:

a communication interface, configured for communication;

a processor; and a memory, storing computer-executable instructions, wherein when executed by the processor, the instructions cause the processor to execute the following procedure:

determining whether a Data Radio Bearer (DRB)-related identifier that is part of current UE configurations is included in a received Radio Resource Control (RRC) configuration, wherein the DRB-related identifier comprises one of the following: a Protocol Data Unit (PDU) session identifier, a Quantity of Service (QoS) flow identifier, and a Service Data Adaptation Protocol (SDAP) identifier; and if the DRB-related identifier is included in the RRC configuration, then releasing one or a plurality of the following items of a DRB associated with the DRB-related identifier: a Packet Data Convergence Protocol (PDCP) entity, a Radio Link Control (RLC) entity, a Dedicated Traffic Channel (DTCH), a DRB identifier, and an SDAP entity.

In an exemplary embodiment, if the DRB-related identifier is a PDU session identifier or a QoS flow identifier, then the releasing the SDAP entity of the DRB associated with the DRB-related identifier further comprises: releasing the SDAP identifier corresponding to the SDAP entity.

In an exemplary embodiment, when executed by the processor, the instructions further cause the processor to execute the following procedure: if the DRB-related identifier is not included in the RRC configuration, then executing releasing of the DRB associated with the DRB-related identifier; and indicating, to an upper layer of an RRC layer, the releasing of the DRB associated with the DRB-related identifier and the DRB-related identifier, wherein the releasing of the DRB associated with the DRB-related identifier comprises: releasing one or a plurality of the following items of the DRB associated with the DRB-related identifier: the PDCP entity, the RLC entity, and the DTCH.

In an exemplary embodiment, when executed by the processor, the instructions further cause the processor to execute the following procedure: executing a DRB addition and/or modification according to the received RRC configuration, wherein the executing the DRB addition and/or modification comprises: for a DRB identifier included in the RRC configuration but is not part of the current UE configurations, if an RRC connection reconfiguration message comprises a full configuration information element, then associating the added and/or modified DRB with a corresponding DRB-related identifier.

In an exemplary embodiment, the RRC configuration comprises one or a plurality of the following items: a DRB addition modification configuration, an SDAP configuration, and a QoS flow configuration.

The above scheme provided by the present disclosure presents a solution for how to execute radio configuration on the basis of a full configuration option. The above scheme of the present disclosure can achieve DRB management via a full configuration option in an NR QoS architecture, such as DRB re-setup and DRB releasing, such that in an RRC procedure (such as a handover procedure and an RRC reestablishment procedure), a system can support configuration/reconfiguration of radio parameters of different releases.

DESCRIPTION OF THE DRAWINGS

The above and other features of the present disclosure will become more apparent with the following detailed description in conjunction with the accompanying drawings.

DETAILED DESCRIPTION

The following describes the present application in detail with reference to the accompanying drawings and specific embodiments. Note that the present application should not be limited to the specific embodiments described below. In addition, for simplicity, detailed description of the known art not directly related to the present application is omitted to prevent confusion in understanding the present application.

Some terms involved in the present disclosure are described below. If not specifically indicated, the terms involved in the present disclosure use the definitions herein. The terms or information elements given in the present disclosure may be named differently in NR, LTE, and eLTE, but unified terms or information elements are used in the present disclosure. When applied to a specific system, the terms or information elements may be replaced with terms or information elements used in the corresponding system, and values of the information elements are those specified in the corresponding system. A base station in the present disclosure can be a base station of any type, such as a NodeB, an enhanced base station eNB, a base station gNB in a 5G communication system, a micro base station, a picocell base station, a macro base station, or a home base station. The cell can also be a cell covered by any type of base station described above. In addition, a base station and a cell can be interchangeably used in the present disclosure. In the present disclosure, a PDCP can represent an NR PDCP entity or an LTE or eLTE PDCP entity; an RLC (Radio Link Control) can represent an NR RLC entity or an LTE or eLTE RLC entity, similar to that in LTE, RLC UM (Unacknowledge Mode) is an unacknowledged mode, and RLC AM (Acknowledge Mode) is an acknowledged mode.

Some concepts involved in the present disclosure are described below.

QoS Flow: also referred to as a 5G QoS flow, which is the smallest granularity for a QoS forwarding treatment in a 5G system. All services mapped to the same 5G QoS flow will receive the same forwarding treatment (for example, a scheduling policy, a queue management policy, a rate formation policy, and an RLC configuration). Providing different QoS forwarding treatments requires different QoS flows.

PDU: Protocol Data Unit, which is a unit of data processing at a protocol layer.

PDU Session: an association between UE and a data network and for providing a PDU connection service. The type of the association can be an IP, Ethernet, or unstructured network.

PDU Connection Service: a service for providing PDU exchange between UE and a data network.

Master Base Station (Master eNB, denoted as McNB (a base station corresponding to E-UTRAN or LTE or eLTE) or MgNB (a base station corresponding to 5G-RAN or NR)): a base station in multi-connection that at least terminates at a control node mobility management entity (denoted as S1-MME) for processing interaction between UE and a core network. In the present invention, the master base station is denoted as McNB. Note that all schemes or definitions applicable to the McNB are likewise applicable to the MgNB.

Secondary Base Station (Secondary eNB, denoted as SeNB (a base station corresponding to E-UTRAN or LTE or eLTE) or SgNB (a base station corresponding to 5G-RAN or NR)): a base station that provides additional radio resources for UE but does not serve as an McNB in multi-connection. In the present invention, the secondary base station is denoted as SeNB. Note that all schemes or definitions applicable to the SeNB are likewise applicable to the SgNB.

Primary Cell (PCell): a cell that operates at a primary frequency, and on which UE performs an initial connection establishment procedure or initiates a connection reestablishment procedure or which is designated as a primary cell during a handover procedure.

Secondary Cell (SCell): a cell operating at a secondary frequency. The cell can be configured after an RRC connection is established and can be used for providing additional radio resources.

Primary Secondary Cell (PSCell): a cell indicating to UE, during execution of an SCG changing procedure, an SCG cell for performing random access.

Master Cell Group (MCG): for UE not configured with multi-connection, the MCG consists of all serving cells; for UE configured with multi-connection, the MCG consists of a subset of serving cells (namely, a group of serving cells associated with an MeNB or MgNB) including a PCell and 0, 1, or a plurality of SCells.

Secondary Cell Group (SCG): a group of serving cells associated with an SeNB or SgNB in multi-connection. The SCG may include one PSCell and may further include one or a plurality SCells.

Multi-Connectivity: an operation mode of UE in an RRC connected state. In the multi-connectivity, a plurality of cell groups is configured, and the plurality of cell groups comprise one MCG and one or a plurality of SCGs (namely, the UE is connected to a plurality of base stations). If only one MCG (or MeNB or MgNB) and one SCG (or SeNB or SgNB) are configured, then the multi-connectivity is referred to as dual-connection. Namely, the UE in the connected state and having a plurality of receivers and/or transmitters is configured to use EUTRAN and/or 5G-RAN radio resources provided by a plurality of different schedulers; the schedulers may be connected by non-ideal backhaul or ideal backhaul. The multi-connectivity defined in the present disclosure includes the dual-connection. A multi-connectivity data transmission manner includes, but is not limited to, data duplication and link selection.

Split DRB: a bearer, in multi-connectivity, of which a wireless protocol is located in an McNB (or MgNB) and an SeNB (or SgNB) and which uses resources of both the MeNB (or MgNB) and the SeNB (or SgNB). If a PDCP entity of the split DRB is located in a master base station (namely, data arrives at the master base station first and is forwarded by the master base station to a secondary base station to split the data in the master base station), then the split DRB is referred to as an MCG split DRB; if a PDCP entity of the split DRB is located in a secondary base station (namely, data arrives at the secondary base station first and is forwarded by the secondary base station to a master base station to split the data in the secondary base station), then the split DRB is referred to as an SCG split DRB. If not specifically stated, the split bearer in the present invention may be an MCG split DRB or an SCG split DRB.

SCG DRB: a DRB in multi-connectivity, of which a radio protocol is located only at an SCG (or SgNB), and which uses only SCG resources.

MCG DRB: a DRB in multi-connectivity, of which a radio protocol is located only at an MCG (or MgNB), and which uses only SCG resources.

The present disclosure can be applied to a system connected to a 5G core network, such as an NR system and an eLTE system, and can also be applied to a subsequent evolved communication system. The eLTE system refers to an LTE system of a subsequent release connected to a 5G core network (a next generation core network).

In an LTE system of Release 9 or later release, a full configuration option is introduced to an RRC message to execute reconfiguration (also referred to as configuration in the present disclosure, which can be used interchangeably, similarly hereinafter) on a Radio Protocol Layer (namely, RRC) of UE in an RRC procedure comprising a handover procedure and RRC connection reestablishment. In the RRC procedure, if a target base station does not support an RRC protocol release used by a source base station to configure UE, then it is possible that the target base station cannot understand UE configuration information provided by the source base station. In this case, the target base station uses the full configuration option to reconfigure the UE. The target base station includes, in an RRC message, a full configuration option information element (the value thereof is set to "TRUE") to instruct the UE to perform RRC radio configuration with/involving (namely "based on" in the present disclosure) the full configuration option. The full configuration option-based RRC radio configuration comprises initializing (for example, releasing and restoring) a radio configuration of the UE, such that when the UE is served by the source base station (namely, from the source base station), the radio configuration of the UE during handover and reestablishment is independent of a radio configuration previously used. One exception is that a security algorithm during RRC re-setup continues to be used. Therefore, in the full configuration option-based RRC reconfiguration procedure, the UE first releases all other dedicated radio configurations except a Cell Radio Network Temporary Identifier C-RNTI, an MCG security configuration, a Radio Bearer (RB) PDCP/RLC/logical channel configuration, and a logged measurement-related configuration; in the case of a handover procedure, the UE further releases all current common radio configurations, and instead uses default values defined by a protocol. Namely, in the full configuration option-based RRC reconfiguration procedure, the UE needs to first eliminate the configurations from the source base station and then apply, in a relatively "clean" state, the radio configurations from the target base station, such that application of the radio configurations from the target base station is independent of the original configurations from the source base station. Therefore, during the full configuration option-based RRC reconfiguration, the UE also executes the following operations to first enter a relatively "clean" state:

applying a default physical channel configuration;
applying a default semi-persistent scheduling configuration;
applying a default MAC main configuration;
if the UE is NB-IoT UE or a Signaling Radio Bearer (SRB) needs to be reconfigured, then applying default configurations to a corresponding SRB, a corresponding RLC, and a logic channel corresponding to the SRB; and
for each EPS bearer indicated by an EPS (Evolved Packet System) bearer identifier, if the EPS bearer identifier is part of current UE configurations and is included in a DRB addition modification list, then the UE releases a PDCP entity, an RLC entity, a Dedicated Traffic Channel (DTCH), and a DRB identifier of a DRB associated with the EPS bearer identifier or with the EPS bearer indicated by the EPS bearer identifier; if the EPS bearer identifier is part of the current UE configurations but is not included in the DRB addition modification list, then the UE executes a DRB releasing procedure.

Namely, in the full configuration option-based RRC configuration procedure, original configurations provided by the source base station for a DRB need to be released first, and then new configurations provided by the target base station are applied, which is referred to as DRB re-setup. In the above procedure, a DRB identifier is released, and therefore, an EPS bearer identifier needs to serve as an anchor to perform re-setup of a DRB associated with an EPS bearer.

Figure 1:
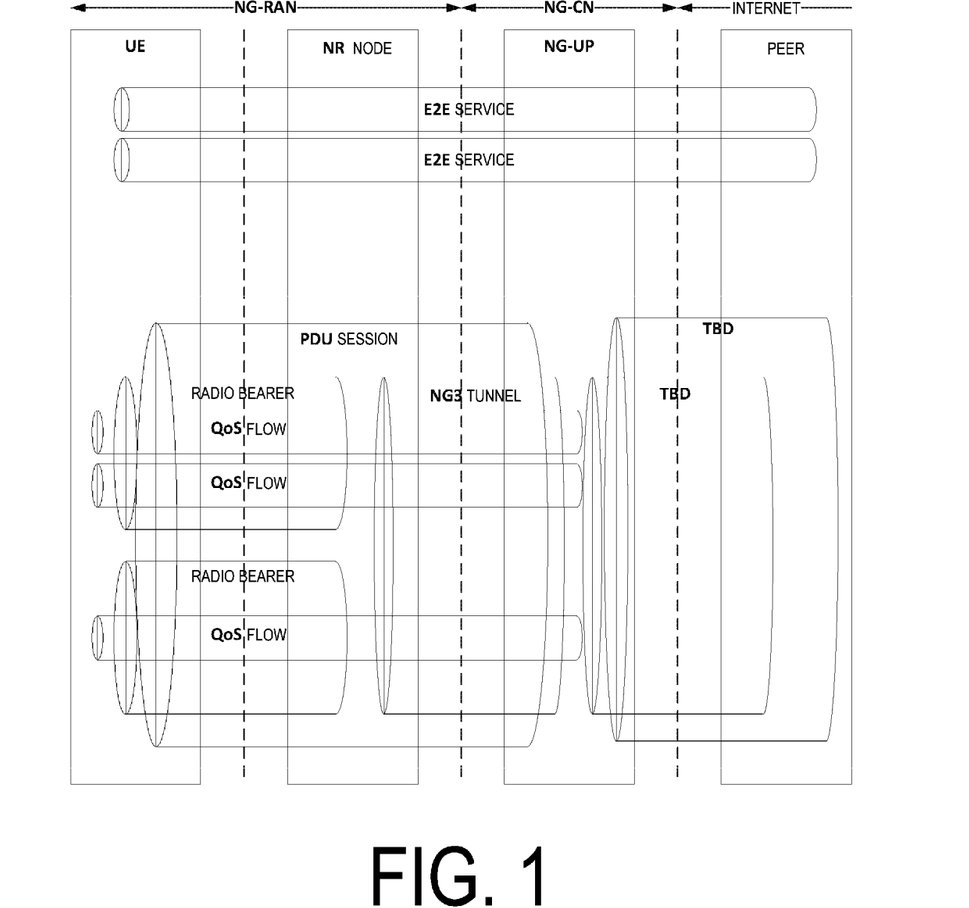
FIG. 1 schematically shows an NR QoS architecture to which a full configuration option-based radio configuration method according to the present disclosure can be applied.
Figure 2:
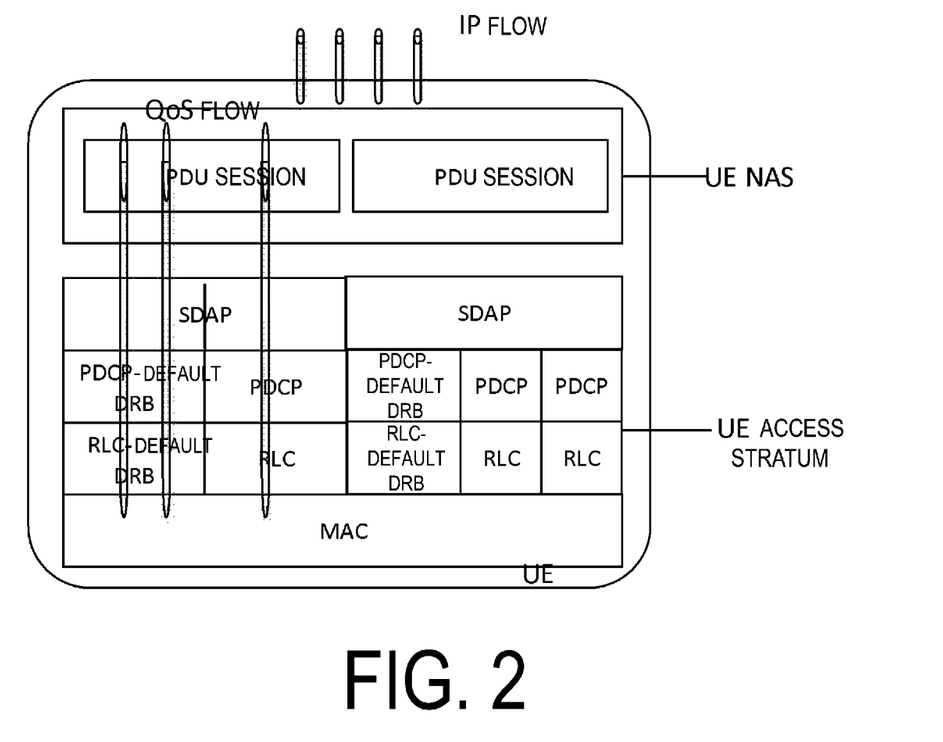
FIG. 2 shows a schematic diagram of mapping data packets of different QoS flows or data packets from different PDU sessions to different DRBs.

As stated in the background section, referring to FIG. 1, a core network establishes one or a plurality of PDU sessions for a piece of UE in an NR QoS architecture. A RAN sets up one or a plurality of DRBs for each PDU session of each piece of UE. An NAS packet filter associates an uplink or downlink data packet with a corresponding QoS flow, so as to map the data packet to the QoS flow; an SDAP entity of the RAN maps data packets of different QoS flows, namely data packets from different PDU sessions, to different DRBs, as shown in FIG. 2. During establishment of a PDU session, the RAN establishes at least one default DRB for one PDU session; optionally, when Dual Connectivity (DC) (also referred to as Multiple Connectivity (MC)) is configured, for a PDU session transmitted in both a Master Cell Group (MCG) (also referred to as a master base station, for example an MeNB/MgNB, or a master node, or a master network) and a Secondary Cell Group (SCG) (also referred to as a secondary base station, for example an SeNB/SgNB, or a secondary node, or a secondary network), a default DRB can be set up in each of the MCG and the SCG.

The SDAP entity is used for supporting all functions of a QoS flow-based QoS architecture at an AS level (access stratum level) in a 5G system, namely, the SDAP entity can execute corresponding operations, including: mapping between a DRB and a QoS flow and identification of a QoS flow ID for uplink and/or downlink data packets; the functions may also include other functions required by the QoS flow-based QoS architecture at the AS level, such as reordering and order-based delivery. The entity may also be named differently. An SDAP configuration comprises a corresponding configuration used for supporting an SDAP layer function. The configuration can comprise any one or a plurality of the following: a QoS mapping criterion (for example, a criterion for mapping between a DRB and a QoS flow, a criterion for mapping between a DRB and an SDAP, a criterion for mapping between a QoS flow and an SDAP, and a criterion for mapping between a DRB and a PDU session), an SDAP identifier, a Protocol Data Unit (PDU) session identity/identifier associated with an SDAP entity, a reflective QoS configuration (for example, enabling or disabling of reflective mapping), a QoS flow identifier for an uplink or/and downlink data packet, an indication regarding whether a QoS flow identifier for an uplink or/and downlink data packet needs to be included, and the like. The configuration can be a configuration acquired by means of an RRC message or a configuration acquired by other means. For example, a reflective QoS mechanism configuration is acquired by means of information in a user plane data packet in a reflective QoS mechanism.

If DC (or MC) is not configured, then one PDU session can correspond to one SDAP entity. If DC is configured, then the same or different QoS flows of one PDU session can be transmitted in both an MCG (also referred to as a master base station, for example an MeNB/MgNB, or a master node, or a master network) and an SCG (also referred to as a secondary base station, for example an SeNB/SgNB, or a secondary node, or a secondary network), and in this case, one PDU session corresponds to two SDAP entities, with one SDAP entity corresponding to the MCG and the other corresponding to the SCG. In a wider perspective, it can also be considered that if more than two serving nodes are present, then one PDU session corresponds to a plurality of SDAP entities, and each SDAP entity corresponds to one serving node or a serving cell group consisting of serving cells covered by the serving node. The present disclosure describes the case where DC is not configured and the case where DC is configured, and are also applicable to a multi-connectivity scenario where more than two serving nodes are present.

A full configuration option-based radio configuration method executed at UE (specifically, an RRC layer of the UE, the same below) in, for example, an NR QoS architecture in an NR system according to an exemplary embodiment of the present disclosure is described below with reference to FIG. 3.

In the present disclosure, in full configuration option-based RRC configuration, a DRB-related identifier not changed in this procedure (for example, a full configuration option-based handover or RRC reestablishment procedure) serves as an anchor to perform DRB re-setup. Generally, the DRB-related identifier is not an identifier allocated by a RAN, namely, the identifier can be an identifier allocated by a core network or an application layer identifier.

Figure 3:
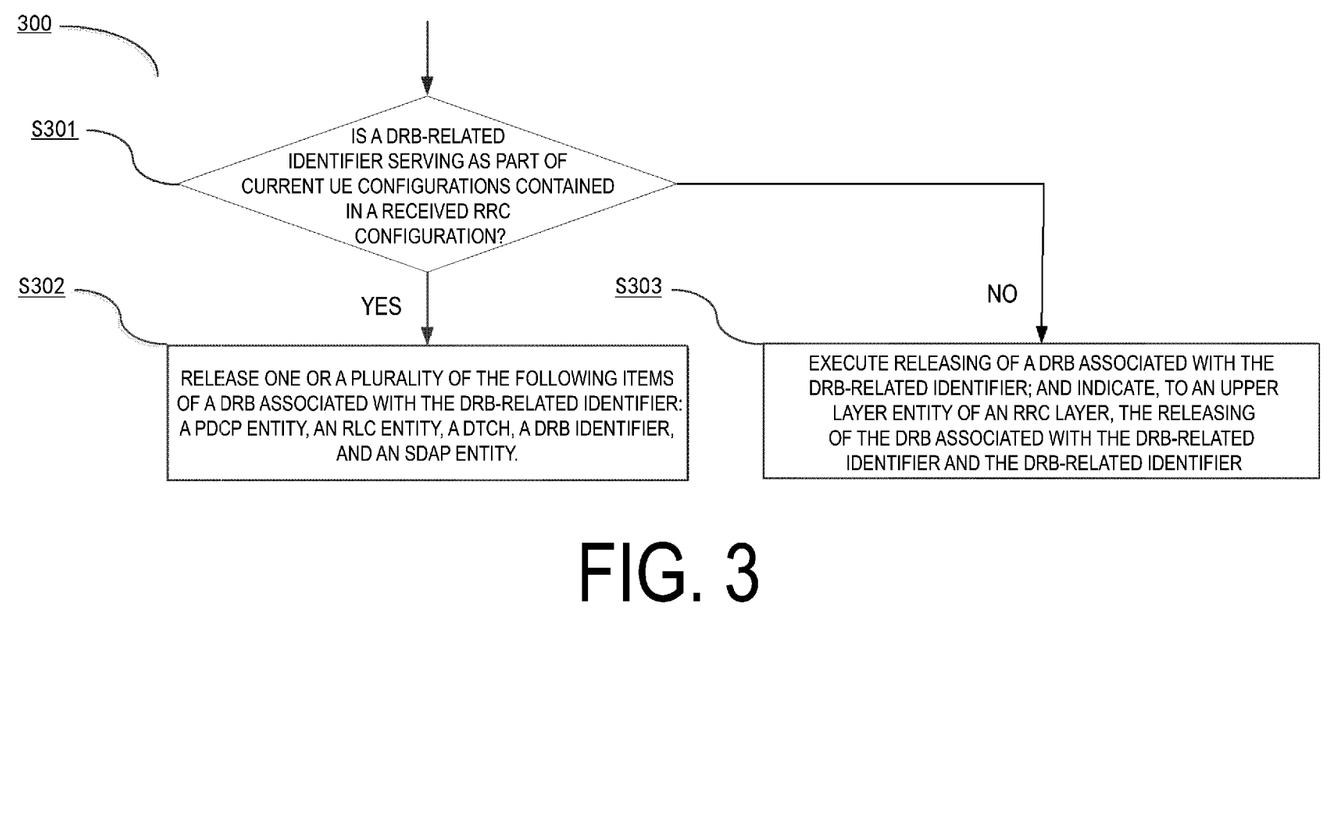
FIG. 3 schematically shows a flowchart of a full configuration option-based radio configuration method executed at UE according to an exemplary embodiment of the present disclosure.

FIG. 3 schematically shows a flowchart of a full configuration option-based radio configuration method 300 executed by UE in an RRC procedure according to an exemplary embodiment of the present disclosure. As shown in FIG. 3, the method 300 may comprise steps S301, S302, and S303.

Before step S301, the UE can receive an RRC configuration from a target base station. The RRC configuration comprises information used for associating a PDU session with a DRB, and can comprise one or a plurality of the following items: a DRB addition modification configuration, an SDAP configuration, and a QoS flow configuration.

As stated above, in the RRC procedure, if the target base station does not support an RRC protocol release used by a source base station to configure the UE, then it is possible that the target base station cannot understand UE configuration information provided by the source base station. In this case, the target base station uses a full configuration option to reconfigure the UE.

In step S301, the UE can determine whether a DRB-related identifier that is part of current UE configurations is included in the received RRC configuration. Namely, the UE can determine whether the DRB-related identifier that is part of the current UE configurations from the source base station is included in the received RRC configuration from the target base station.

The DRB-related identifier can comprise one of the following: a PDU session identifier, a QoS flow identifier, and an SDAP identifier.

The RRC configuration can comprise one or a plurality of the following items: a DRB addition modification configuration, an SDAP configuration, and a QoS flow configuration.

If the DRB-related identifier is included in the received RRC configuration, then the UE can, in step S302, release one or a plurality of the following items of a DRB associated with the DRB-related identifier: a PDCP entity, an RLC entity, a DTCH, a DRB identifier, and an SDAP entity.

If the DRB-related identifier is a PDU session identifier or a QoS flow identifier, then the releasing an SDAP entity of a DRB associated with the DRB-related identifier may further include releasing an SDAP identifier corresponding to the SDAP entity.

If the DRB-related identifier is not included in the received RRC configuration, then the UE can, in step S303, execute releasing of the DRB associated with the DRB-related identifier; and indicate, to an upper layer of a Radio Resource Control (RRC) layer, the releasing of the DRB associated with the DRB-related identifier and the DRB-related identifier, wherein the releasing of the DRB associated with the DRB-related identifier includes: releasing one or a plurality of the following items of the DRB associated with the DRB-related identifier: a PDCP entity, an RLC entity, and a DTCH.

Then, the method 300 can further comprise the following step (not shown): executing the DRB addition and/or modification according to the received RRC configuration, wherein the executing DRB the addition and/or modification includes: for a DRB identifier included in the RRC configuration but is not part of the current UE configurations, if an RRC connection reconfiguration message comprises a full configuration information element, then associating the added (also referred to as "set up") and/or modified DRB with a corresponding DRB-related identifier.

A plurality of embodiments of the method 300 are described below in detail according to a specific form of an adopted DRB-related identifier.

Embodiment 1

In this embodiment, in full configuration option-based RRC configuration, a PDU session identifier serves as a DRB-related identifier, and DRB re-setup uses the PDU session identifier as an anchor. The PDU session identifier is used for uniquely identifying a PDU session.

In step S301, UE can determine whether a PDU session identifier that is part of current UE configurations is included in a received RRC configuration.

If the PDU session identifier is included in the received RRC configuration, then the UE can, in step S302, release one or a plurality of the following items of a DRB associated with the PDU session identifier: a PDCP entity, an RLC entity, a DTCH, a DRB identifier, and an SDAP entity.

Specifically, for each PDU session identifier that is part of the current UE configurations and included in the received RRC configuration, the UE can execute one or a plurality of the following operations:

releasing a PDCP entity of a DRB associated with the PDU session identifier or with a PDU session indicated by the PDU session identifier, wherein the releasing a PDCP entity of a DRB associated with the PDU session identifier or with a PDU session indicated by the PDU session identifier includes: releasing all (or one or a plurality of) PDCP entities of all (or one or a plurality of) DRBs associated with the PDU session identifier or with the PDU session indicated by the PDU session identifier;

releasing an RLC entity of a DRB associated with the PDU session identifier or with a PDU session indicated by the PDU session identifier, wherein the releasing an RLC entity of a DRB associated with the PDU session identifier or with a PDU session indicated by the PDU session identifier includes: releasing all (or one or a plurality of) RLC entities of all (or one or a plurality of) DRBs associated with the PDU session identifier or with the PDU session indicated by the PDU session identifier;

releasing a DTCH logical channel of a DRB associated with the PDU session identifier or with a PDU session indicated by the PDU session identifier, wherein the releasing a DTCH logical channel of a DRB associated with the PDU session identifier or with a PDU session indicated by the PDU session identifier includes: releasing all (or one or a plurality of) DTCH logical channels of all (or one or a plurality of) DRBs associated with the PDU session identifier or with the PDU session indicated by the PDU session identifier;

releasing a DRB identifier of a DRB associated with the PDU session identifier or with a PDU session indicated by the PDU session identifier, wherein the releasing a DRB identifier of a DRB associated with the PDU session identifier or with a PDU session indicated by the PDU session identifier includes releasing all (or one or a plurality of) DRB identifiers of all (or one or a plurality of) DRBs associated with the PDU session identifier or with the PDU session indicated by the PDU session identifier; or releasing one or a plurality of SDAP entities associated with the PDU session identifier or with a PDU session indicated by the PDU session identifier. Optionally, the operations further comprise releasing an SDAP identifier corresponding to the SDAP entity.

The above operations will preserve the PDU session identifier, but will remove DRBs and DRB identifiers of these bearers in the current UE configurations, and trigger setup of a DRB that uses a new configuration. The PDU session identifier serves as an anchor to associate a DRB that is re-set up after releasing.

If the PDU session identifier is not included in the received RRC configuration, then the UE can, in step S303, execute releasing of the DRB associated with the PDU session identifier; and indicate, to an upper layer of a Radio Resource Control (RRC) layer, the releasing of the DRB associated with the PDU session identifier and the PDU session identifier, wherein the releasing of the DRB associated with the PDU session identifier includes: releasing one or a plurality of the following items of the DRB associated with the PDU session identifier: a PDCP entity, an RLC entity, and a DTCH.

Specifically, for each PDU session identifier that is part of the current UE configurations and not included in the received RRC configuration, the UE can execute the following operations: for all (one or a plurality of) DRBs associated with the PDU session identifier or with a PDU session indicated by the PDU session identifier, executing releasing of the DRB associated with the PDU session identifier.

The executing releasing of the DRB includes: for the DRB, releasing a PDCP entity, releasing (one or a plurality of) RLC entities, releasing a DTCH logical channel, and indicating, to the upper layer (for example, a NAS) of the RRC layer, the releasing of the DRB and the PDU session identifier associated with the DRB. The indicating, to the upper layer, the releasing of the DRB and the PDU session identifier associated with the DRB includes: if the procedure is triggered by handover, then after the handover succeeds, indicating, to the upper layer, the releasing of the DRB and the PDU session identifier associated with the DRB; otherwise, immediately indicating, to the upper layer, the releasing of the DRB and the PDU session identifier associated with the DRB.

As stated above, the received RRC configuration comprises one or a plurality of the following items: a DRB addition modification configuration, an SDAP configuration, and a QoS flow configuration, and is carried by RRC signaling.

Optionally, the method 100 can further comprise the following step: executing the DRB addition and/or modification according to the received RRC configuration.

Specifically, the executing the DRB addition and/or modification includes: for a DRB identifier included in the RRC configuration but is not part of the current UE configurations:

if a DRB addition and/or modification configuration used for an SCG is not received or the DRB addition and/or modification configuration used for the SCG does not comprise the DRB identifier (namely, a DRB associated with the DRB identifier is added and serves as an MCG DRB), then:

establishing a PDCP entity, configuring the PDCP entity according to a received PDCP configuration, and using a current MCG security configuration to configure the PDCP entity;

establishing one or a plurality of RLC entities according to a received RLC configuration; and establishing a DTCH logical channel according to a received logical channel identifier and logical channel configuration;

if an RRC connection reconfiguration message comprises a full configuration information element, then associating the added and/or modified DRB with a corresponding PDU session identifier.

Optionally, before step S301, the UE can receive an RRC configuration from a target base station. The RRC configuration comprises information used for associating a PDU session with a DRB. An example is provided below:

```
SDAP - configuration - r15    ::=   SEQUENCE {
    PDUsessionIdentity              INTEGER (0 . . x)
    sdap - Identity                 SDAP - Identity
    DRBmapping - config             DRBmapping - Config - r15
    ......
}
DRBmapping - config - r15     ::=   SEQUENCE {
    drb - Identity - r12            DRB - Identity,
    mapping - config                QOSflowIdentityList
}
```

Embodiment 2

In this embodiment, in full configuration option-based RRC configuration, a QoS flow identifier serves as a DRB-related identifier, and DRB re-setup uses the QoS flow identifier as an anchor.

In step S301, the UE can determine whether a QoS flow identifier that is part of current UE configurations is included in the received RRC configuration.

If the QoS flow identifier is included in the received RRC configuration, then the UE can, in step S302, release one or a plurality of the following items of a DRB associated with the QoS flow identifier: a PDCP entity, an RLC entity, a DTCH, a DRB identifier, and an SDAP entity.

Specifically, for each QoS flow identifier that is part of the current UE configurations and included in the received RRC configuration, the UE can execute one or a plurality of the following operations:

releasing a PDCP entity of a DRB associated with the QoS flow identifier or with a QoS flow indicated by the QoS flow identifier, wherein the releasing a PDCP entity of a DRB associated with the QoS flow identifier or with a QoS flow indicated by the QoS flow identifier includes: releasing all (or one or a plurality of) PDCP entities of all (or one or a plurality of) DRBs associated with the QoS flow identifier or with the QoS flow indicated by the QoS flow identifier;

releasing an RLC entity of a DRB associated with the QoS flow identifier or with a QoS flow indicated by the QoS flow identifier, wherein the releasing an RLC entity of a DRB associated with the QoS flow identifier or with a QoS flow indicated by the QoS flow identifier includes: releasing all (or one or a plurality of) RLC entities of all (or one or a plurality of) DRBs associated with the QoS flow identifier or with the QoS flow indicated by the QoS flow identifier;

releasing a DTCH logical channel of a DRB associated with the QoS flow identifier or with a QoS flow indicated by the QoS flow identifier, wherein the releasing a DTCH logical channel of a DRB associated with the QoS flow identifier or with a QoS flow indicated by the QoS flow identifier includes: releasing all (or one or a plurality of) DTCH logical channels of all (or one or a plurality of) DRBs associated with the QoS flow identifier or with the QoS flow indicated by the QoS flow identifier;

releasing a DRB identifier of a DRB associated with the QoS flow identifier or with a QoS flow indicated by the QoS flow identifier, wherein the releasing a DRB identifier of a DRB associated with the QoS flow identifier or with a QoS flow indicated by the QoS flow identifier includes: releasing DRB identifiers of all (or one or a plurality of) DRBs associated with the QoS flow identifier or with the QoS flow indicated by the QoS flow identifier; or releasing one or a plurality of SDAP entities associated with the QoS flow identifier or with a QoS flow indicated by the QoS flow identifier, wherein the releasing one or a plurality of SDAP entities associated with the QoS flow identifier or with a QoS flow indicated by the QoS flow identifier includes: releasing one or a plurality of SDAP entities associated with the QoS flow identifier or with the QoS flow indicated by the QoS flow identifier, if the associated SDAP entity is present.

Optionally, the operations further comprise releasing an SDAP identifier corresponding to the SDAP entity.

The above operations will preserve the QoS flow identifier, but will remove DRBs and DRB identifiers of these bearers in the current UE configurations, and trigger setup of a DRB that uses a new configuration. The QoS flow identifier serves as an anchor to associate a DRB that is re-set up after releasing.

If the QoS flow identifier is not included in the received RRC configuration, then the UE can, in step S303, execute releasing of the DRB associated with the QoS flow identifier; and indicate, to an upper layer of a Radio Resource Control (RRC) layer, the releasing of the DRB associated with the QoS flow identifier and the QoS flow identifier, wherein the releasing of the DRB associated with the QoS flow identifier includes: releasing one or a plurality of the following items of the DRB associated with the QoS flow identifier: a PDCP entity, an RLC entity, and a DTCH.

Specifically, for each QoS flow identifier that is part of the current UE configurations and not included in the received RRC configuration, the UE can execute the following operation: executing releasing of the DRB associated with the QoS flow identifier.

Optionally, releasing of the DRB is executed if the QoS flow identifier (the indicated QoS flow) is the only QoS flow associated with the associated DRB.

The releasing of the DRB can be executed for all or one or a plurality of DRBs associated with the QoS flow identifier or with the QoS flow indicated by the QoS flow identifier.

The executing releasing of the DRB includes: for the DRB, releasing a PDCP entity, releasing (one or a plurality of) RLC entities, releasing a DTCH logical channel, and indicating, to the upper layer (for example, a NAS), the releasing of the DRB and the QoS flow identifier associated with the DRB. The indicating, to the upper layer, the releasing of the DRB and the QoS flow identifier associated with the DRB includes: if the procedure is triggered by handover, then after the handover succeeds, indicating, to the upper layer, the releasing of the DRB and the QoS flow identifier associated with the DRB; otherwise, immediately indicating, to the upper layer, the releasing of the DRB and the QoS flow identifier associated with the DRB.

As stated above, the received RRC configuration comprises one or a plurality of the following items: a DRB addition modification configuration, an SDAP configuration, and a QoS flow configuration, and is carried by RRC signaling.

Optionally, the method 100 can further comprise the following step: executing the DRB addition and/or modification according to the received RRC configuration.

Specifically, the executing the DRB addition and/or modification includes: for a DRB identifier included in the RRC configuration but is not part of the current UE configurations:

if a DRB addition and/or modification configuration used for an SCG is not received or the DRB addition and/or modification configuration used for the SCG does not comprise the DRB identifier (namely, a DRB associated with the DRB identifier is added and serves as an MCG DRB), then:
  establishing a PDCP entity, configuring the PDCP entity according to a received PDCP configuration, and using a current MCG security configuration to configure the PDCP entity;
  establishing one or a plurality of RLC entities according to a received RLC configuration; and
  establishing a DTCH logical channel according to a received logical channel identifier and logical channel configuration;
if an RRC connection reconfiguration message comprises a full configuration information element, then associating the added and/or modified DRB with a corresponding QoS flow identifier.

In this embodiment, preferably, the QoS flow identifier can be unique within one PDU session, namely, QoS flow identifiers of different QoS flows belonging to different PDU sessions can be duplicate. Alternatively, the QoS flow identifier can be unique among PDU sessions, namely, QoS flow identifiers of different QoS flows belonging to different PDU sessions are different. Based on the above considerations, optionally, when the QoS flow identifier is unique only within one PDU session, the QoS flow identifier in this embodiment can be replaced with the QoS flow identifier and a corresponding PDU session identifier. The PDU session identifier is used for uniquely identifying a PDU session.

Optionally, before step S301, the UE can receive an RRC configuration from a target base station. The RRC configuration comprises information used for associating a QoS flow with a DRB. An example is provided below:

```
DRBmapping - config - r15 ::= SEQUENCE {
    drb - Identity - r12           DRB - Identity,
    mapping - config               QOSflowIdentityList
}
```

Embodiment 3

In this embodiment, in full configuration option-based RRC configuration, an SDAP identifier serves as a DRB-related identifier, and DRB re-setup uses the SDAP identifier as an anchor.

In step S301, the UE can determine whether an SDAP identifier that is part of current UE configurations is included in the received RRC configuration.

If the SDAP identifier is included in the received RRC configuration, then the UE can, in step S302, release one or a plurality of the following items of a DRB associated with the SDAP identifier: a PDCP entity, an RLC entity, a DTCH, a DRB identifier, and an SDAP entity.

Specifically, for each SDAP identifier that is part of the current UE configurations and included in the received RRC configuration, the UE can execute one or a plurality of the following operations:
  releasing a PDCP entity of a DRB associated with the SDAP identifier or with an SDAP indicated by the SDAP identifier, wherein
  the releasing a PDCP entity of a DRB associated with the SDAP identifier or with an SDAP indicated by the SDAP identifier includes: releasing all (or one or a plurality of) PDCP entities of all (or one or a plurality of) DRBs associated with the SDAP identifier or with the SDAP indicated by the SDAP identifier;
  releasing an RLC entity of a DRB associated with the SDAP identifier or with an SDAP indicated by the SDAP identifier, wherein
  the releasing an RLC entity of a DRB associated with the SDAP identifier or with an SDAP indicated by the SDAP identifier includes: releasing all (or one or a plurality of) RLC entities of all (or one or a plurality of) DRBs associated with the SDAP identifier or with the SDAP indicated by the SDAP identifier;
  releasing a DTCH logical channel of a DRB associated with the SDAP identifier or with an SDAP indicated by the SDAP identifier, wherein
  the releasing a DTCH logical channel of a DRB associated with the SDAP identifier or with an SDAP indicated by the SDAP identifier includes: releasing all (or one or a plurality of) DTCH logical channels of all (or one or a plurality of) DRBs associated with the SDAP identifier or with the SDAP indicated by the SDAP identifier;
  releasing a DRB identifier of a DRB associated with the SDAP identifier or with an SDAP indicated by the SDAP identifier, wherein
  the releasing a DRB identifier of a DRB associated with the SDAP identifier or with an SDAP indicated by the SDAP identifier includes: releasing DRB identifiers of all (or one or a plurality of) DRBs associated with the SDAP identifier or with the SDAP indicated by the SDAP identifier; or
  releasing one or a plurality of SDAP entities associated with the SDAP identifier or with an SDAP indicated by the SDAP identifier, which is optional.

The above operations will preserve the SDAP identifier, but will remove DRBs and DRB identifiers of these bearers in the current UE configurations, and trigger setup of a DRB that uses a new configuration. The SDAP identifier serves as an anchor to associate a DRB that is re-set up after releasing.

If the SDAP identifier is not included in the received RRC configuration, then the UE can, in step S303, execute releasing of the DRB associated with the SDAP identifier; and indicate, to an upper layer of a Radio Resource Control (RRC) layer, the releasing of the DRB associated with the SDAP identifier and the SDAP identifier, wherein the releasing of the DRB associated with the SDAP identifier includes: releasing one or a plurality of the following items of the DRB associated with the SDAP identifier: a PDCP entity, an RLC entity, and a DTCH.

Specifically, for each SDAP identifier that is part of the current UE configurations and not included in the received RRC configuration, the UE can execute the following operations: for all (one or a plurality of) DRBs associated with the SDAP identifier or with an SDAP entity indicated by the SDAP identifier, executing releasing of the DRB associated with the SDAP identifier.

The executing releasing of the DRB includes: for the DRB, releasing a PDCP entity, releasing (one or a plurality of) RLC entities, releasing a DTCH logical channel, and indicating, to the upper layer (for example, a NAS), the releasing of the DRB and the SDAP identifier associated with the DRB. The indicating, to the upper layer, the releasing of the DRB and the SDAP identifier associated with the DRB includes: if the procedure is triggered by handover, then after the handover succeeds, indicating, to the upper layer, the releasing of the DRB and the SDAP identifier associated with the DRB; otherwise, immediately indicating, to the upper layer, the releasing of the DRB and the SDAP identifier associated with the DRB.

As stated above, the received RRC configuration comprises one or a plurality of the following items: a DRB addition modification configuration, an SDAP configuration, and a QoS flow configuration, and is carried by RRC signaling.

Optionally, the method 100 can further comprise the following step: executing the DRB addition and/or modification according to the received RRC configuration, wherein
if a DRB addition and/or modification configuration used for an SCG is not received or the DRB addition and/or modification configuration used for the SCG does not comprise the DRB identifier (namely, a DRB associated with the DRB identifier is added and serves as an MCG DRB), then:
  establishing a PDCP entity, configuring the PDCP entity according to a received PDCP configuration, and using a current MCG security configuration to configure the PDCP entity;
  establishing one or a plurality of RLC entities according to a received RLC configuration; and
  establishing a DTCH logical channel according to a received logical channel identity and logical channel configuration;
if an RRC connection reconfiguration message comprises a full configuration information element, then associating the added and/or modified DRB with a corresponding SDAP identifier.

Optionally, the above SDAP identifier can be replaced with a default DRB identifier. As stated above, in a case where a default DRB is configured for a PDU session in an SDAP entity and in case of DC, an MCG and an SCG respectively correspond to different SDAP entities, and a default DRB is configured for an associated PDU session in each SDAP entity. Therefore, an identifier of a default DRB can uniquely identify an SDAP entity on a piece of UE, and in this case, an identifier of the SDAP entity is equivalent to the identifier of the default DRB.

Optionally, before step S301, the UE can receive an RRC configuration from a target base station. The RRC configuration comprises information used for associating an SDAP entity with a DRB.

```
DRB - ToAddMod    ::=   SEQUENCE {
    SDAP - IIdentity       INTEGER (0 . . x)     OPTIONAL, - - Cond DRB - Setup
    drb - Identity         DRB - Identity,
    pdcp - Config          PDCP - Config         OPTIONAL, - - Cond PDCP
    rlc - Config           RLC - Config          OPTIONAL, - - Cond SetupM
    logicalChannelIdentity INTEGER (3 . . 10)    OPTIONAL, - - Cond DRB - SetupM
    logicalChannelConfig   LogicalChannelConfigOPTIONAL, - - Cond SetupM
    ....,
    .
    .
    .
}
```

```
SDAP - configuration   ::=  SEQUENCE {
    SDAP - IIdentity              INTEGER (0 . . x)   OPTIONAL,
    drb - List                    DRB - Identity - list,
}
```

Figure 4:
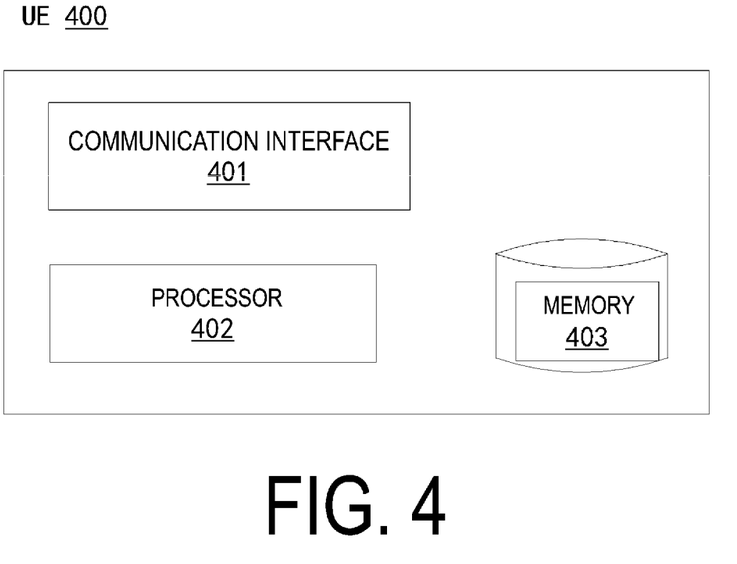
FIG. 4 schematically shows a structural block diagram of UE for executing a full configuration option-based radio configuration method according to an exemplary embodiment of the present disclosure.

A structure of UE according to an exemplary embodiment of the present invention will be described below with reference to FIG. 4. FIG. 4 schematically shows a structural block diagram of UE for executing a full configuration option-based radio configuration method according to an exemplary embodiment of the present invention. UE 400 can be used to execute the method 300 described with reference to FIG. 3. For the sake of simplicity, only a schematic structure of the UE according to the exemplary embodiment of the present disclosure will be described herein, and details already described in the method 300 as described above with reference to FIG. 3 are omitted.

As shown in FIG. 4, the UE 400 comprises a communication interface 401 for external communication; a processing unit or processor 402, which may be a single unit or a combination of a plurality of units for executing different steps of the method; and a memory 403, storing computer-executable instructions thereon, which, when executed by the processor 402, cause the processor 402 to perform the following procedure:
determining whether a Data Radio Bearer (DRB)-related identifier that is part of current UE configurations is included in a received Radio Resource Control (RRC) configuration, wherein the DRB-related identifier comprises one of the following: a Protocol Data Unit (PDU) session identifier, a Quantity of Service (QoS) flow identifier, and a Service Data Adaptation Protocol (SDAP) identifier; and
if the DRB-related identifier is included in the RRC configuration, then releasing one or a plurality of the following items of a DRB associated with the DRB-related identifier: a Packet Data Convergence Protocol (PDCP) entity, a Radio Link Control (RLC) entity, a Dedicated Traffic Channel (DTCH), a DRB identifier, and an SDAP entity.

In an exemplary embodiment, if the DRB-related identifier is a PDU session identifier or a QoS flow identifier, then the releasing an SDAP entity of a DRB associated with the DRB-related identifier further includes: releasing an SDAP identifier corresponding to the SDAP entity.

In an exemplary embodiment, when executed by the processor, the instructions further cause the processor to execute the following procedure: if the DRB-related identifier is not included in the RRC configuration, then executing releasing of the DRB associated with the DRB-related identifier; and indicating, to an upper layer of an RRC layer, the releasing of the DRB associated with the DRB-related identifier and the DRB-related identifier, wherein the releasing of the DRB associated with the DRB-related identifier includes: releasing one or a plurality of the following items of the DRB associated with the DRB-related identifier: a PDCP entity, an RLC entity, and a DTCH.

In an exemplary embodiment, when executed by the processor, the instructions further cause the processor to execute the following procedure: executing the DRB addition and/or modification according to the received RRC configuration, wherein the executing the DRB addition and/or modification includes: for a DRB identifier included in the RRC configuration but is not part of the current UE configurations, if an RRC connection reconfiguration message comprises a full configuration information element, then associating the added and/or modified DRB with a corresponding DRB-related identifier.

In an exemplary embodiment, the RRC configuration comprises one or a plurality of the following items: a DRB addition modification configuration, an SDAP configuration, and a QoS flow configuration.

The program running on the device according to the present disclosure may be a program that enables a computer to implement the functions of the embodiments of the present disclosure by controlling a central processing unit (CPU). The program or information processed by the program can be stored temporarily in a volatile memory (for example, a random access memory (RAM)), a hard disk drive (HDD), a non-volatile memory (for example, a flash memory), or other memory systems.

The program for implementing the functions of the embodiments of the present disclosure may be recorded on a computer-readable recording medium. The corresponding functions can be achieved by reading programs recorded on the recording medium and executing them by the computer system. The so-called "computer system" herein may be a computer system embedded in the device, which may include operating systems or hardware (for example, peripherals). The "computer-readable recording medium" may be a semiconductor recording medium, an optical recording medium, a magnetic recording medium, a recording medium for programs that are dynamically stored for a short time, or any other recording medium readable by a computer.

Various features or functional modules of the device used in the above embodiments may be implemented or executed through circuits (for example, monolithic or multi-chip integrated circuits). Circuits designed to execute the functions described in this description may include general-purpose processors, digital signal processors (DSPs), application specific integrated circuits (ASICs), field programmable gate arrays (FPGAs) or other programmable logic devices, discrete gates or transistor logic, or discrete hardware components, or any combination of the above. The general-purpose processor may be a microprocessor, or may be any existing processor, controller, microcontroller, or state machine. The circuit may be a digital circuit or an analog circuit. When new integrated circuit technologies that replace existing integrated circuits emerge because of the advances in semiconductor technology, one or a plurality of embodiments of the present disclosure may also be implemented using these new integrated circuit technologies.

Furthermore, the present disclosure is not limited to the embodiments described above. Although various examples of the described embodiments have been described, the present disclosure is not limited thereto. Fixed or non-mobile electronic devices installed indoors or outdoors, such as AV equipment, kitchen equipment, cleaning equipment, air conditioner, office equipment, vending machines, and other household appliances, may be used as terminal devices or communications devices.

The embodiments of the present disclosure have been described in detail above with reference to the accompanying drawings. However, the specific structures are not limited to the above embodiments. The present disclosure also includes any design modifications that do not depart from the substance of the present disclosure. In addition, various modifications can be made to the present disclosure within the scope of the claims. Embodiments resulted from the appropriate combinations of the technical means disclosed in different embodiments are also included within the technical scope of the present disclosure. In addition, components with the same effect described in the above embodiments may be replaced with one another.

The invention claimed is:

1. A method performed by a UE comprising:
   receiving a radio resource control (RRC) reconfiguration message including a full configuration information element (IE);
   performing a full configuration procedure in response to receiving the RRC reconfiguration message including the full configuration IE,
   releasing a Service Data Adaptation Protocol (SDAP) entity for each protocol data unit (PDU) session identifier that is part of a current UE configuration in the full configuration procedure;
   releasing Data Radio Bearers (DRBs), each of the DRBs being associated with the PDU session identifier in the full configuration procedure; and
   indicating, to an upper layer of an RRC layer, the release of the DRBs that are associated with the PDU session identifier upon determining that the PDU session identifier is not included in the received RRC reconfiguration message in the full configuration procedure.

2. A method performed by a base station, comprising:
   transmitting a radio resource control (RRC) reconfiguration message including a full configuration information element (IE), wherein in a full configuration procedure performed by a UE in response to receiving the RRC reconfiguration message including the full configuration IE, the RRC reconfiguration message causes the UE to:
   release a Service Data Adaptation Protocol (SDAP) entity for each protocol data unit (PDU) session identifier that is part of a current UE configuration in the full configuration procedure;
   release Data Radio Bearers (DRBs), each of the DRBs being associated with the PDU session identifier in the full configuration procedure; and indicate, to an upper layer of an RRC layer, the release of the DRBs that are associated with the PDU session identifier, wherein the PDU session identifier is not included in the RRC reconfiguration message in the full configuration procedure.

3. A user equipment (UE) comprising:

a processing circuitry configured and/or programmed to:

receive a radio resource control (RRC) reconfiguration message including a full configuration information element (IE);

perform a full configuration procedure in response to receiving the RRC reconfiguration message including the full configuration IE;

release a Service Data Adaptation Protocol (SDAP) entity for each protocol data unit (PDU) session identifier that is part of a current UE configuration in the full configuration procedure;

release Data Radio Bearers (DRBs), each of the DRBs being associated with the PDU session identifier in the full configuration procedure; and indicate, to an upper layer of an RRC layer, the release of the DRBs that are associated with the PDU session identifier upon determining that the PDU session identifier is not included in the received RRC reconfiguration message in the full configuration procedure.

4. A base station, comprising:

a processing circuitry configured and/or programmed to:

transmit a radio resource control (RRC) reconfiguration message including a full configuration information element (IE), wherein in a full configuration procedure performed by a UE in response to receiving the RRC reconfiguration message including the full configuration IE, the RRC reconfiguration message causes the UE to:

release a Service Data Adaptation Protocol (SDAP) entity for each protocol data unit (PDU) session identifier that is part of a current UE configuration in the full configuration procedure;

release Data Radio Bearers (DRBs), each of the DRBs being associated with the PDU session identifier in the full configuration procedure; and indicate, to an upper layer of an RRC layer, the release of the DRBs that are associated with the PDU session identifier, wherein the PDU session identifier is not included in the RRC reconfiguration message in the full configuration procedure.

* * * * *